(12) United States Patent
Gallon et al.

(10) Patent No.: US 11,085,390 B2
(45) Date of Patent: Aug. 10, 2021

(54) SYSTEM AND METHOD FOR A MOTOR VEHICLE WITH REDUCED FUEL ENRICHMENT AFTER A FUEL CUTOFF EVENT

(71) Applicant: GM Global Technology Operations LLC, Detroit, MI (US)

(72) Inventors: Robert Gallon, Northville, MI (US); Michael A. Smith, Clarkston, MI (US); Matt Pedigo, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/696,134

(22) Filed: Nov. 26, 2019

(65) Prior Publication Data

US 2021/0156324 A1    May 27, 2021

(51) Int. Cl.

| | |
|---|---|
| *F02D 41/12* | (2006.01) |
| *F02D 41/14* | (2006.01) |
| *F02D 13/02* | (2006.01) |
| *F02D 9/02* | (2006.01) |

(52) U.S. Cl.
CPC ............. *F02D 41/12* (2013.01); *F02D 9/02* (2013.01); *F02D 13/0238* (2013.01); *F02D 41/1441* (2013.01); *F02D 41/1454* (2013.01); *F02D 2009/022* (2013.01); *F02D 2200/0406* (2013.01); *F02D 2200/0414* (2013.01); *F02D 2200/0814* (2013.01); *F02D 2200/101* (2013.01); *F02D 2200/1006* (2013.01)

(58) Field of Classification Search
CPC .. F02D 13/0238; F02D 13/0215; F02D 41/12; F02D 41/123; F02D 41/1441; F02D 41/1454; F02D 2009/0235; F02D 9/02
See application file for complete search history.

(56) References Cited

U.S. PATENT DOCUMENTS

| | | | | |
|---|---|---|---|---|
| 5,842,339 | A * | 12/1998 | Bush ..................... | F01N 11/007 60/274 |
| 8,667,953 | B2 | 3/2014 | Gallon et al. | |
| 8,726,880 | B2 | 5/2014 | Stewart et al. | |
| 10,731,583 | B2 * | 8/2020 | Choung ................ | F01N 3/2066 |
| 2005/0268599 | A1 * | 12/2005 | Kawakami .......... | F02D 41/1474 60/285 |
| 2007/0163531 | A1 * | 7/2007 | Lewis ....................... | F01L 9/02 123/179.4 |

(Continued)

*Primary Examiner* — Sizo B Vilakazi
*Assistant Examiner* — Anthony L Bacon
(74) *Attorney, Agent, or Firm* — Vivacqua Crane

(57) ABSTRACT

A control system for a fuel cutoff system of a motor vehicle includes a fuel cutoff module that generates a fuel cutoff signal for disabling a supply of fuel to an engine, in response to the fuel cutoff module detecting a deceleration fuel cutoff (DFCO) event. The control system further includes an oxygen storage module determining an amount of oxygen accumulated in a catalyst and comparing this amount to an oxygen storage capacity (OSC) of the catalyst, in response to the fuel cutoff module determining the DFCO event. The control system further includes an intake valve timing module generating a phasing signal to actuate a plurality of cam phasers to reduce a flow rate of oxygen to the catalyst, in response to the fuel cutoff module determining the DFCO event and the oxygen storage module determining that the amount of oxygen stored in the catalyst is less than the OSC.

20 Claims, 2 Drawing Sheets

(56) References Cited

U.S. PATENT DOCUMENTS

| | | | |
|---|---|---|---|
| 2007/0209618 A1* | 9/2007 | Leone | B60W 20/15 |
| | | | 123/90.12 |
| 2007/0209619 A1* | 9/2007 | Leone | F02D 41/042 |
| | | | 123/90.12 |
| 2012/0208674 A1* | 8/2012 | Doering | F02D 9/00 |
| | | | 477/107 |
| 2013/0226439 A1* | 8/2013 | Hashemi | F02N 11/04 |
| | | | 701/112 |
| 2017/0167345 A1* | 6/2017 | Lee | F01N 3/22 |
| 2017/0175656 A1* | 6/2017 | Masubuchi | F01N 3/0864 |

* cited by examiner

SYSTEM AND METHOD FOR A MOTOR VEHICLE WITH REDUCED FUEL ENRICHMENT AFTER A FUEL CUTOFF EVENT

INTRODUCTION

The present disclosure relates to engine control systems for motor vehicles, and more particularly to a system and method for reducing a flow rate of oxygen to a catalyst during a deceleration fuel cutoff event and improving the fuel economy of a motor vehicle.

Engines emit exhaust gas that includes carbon dioxide, water, carbon monoxide (CO), nitrogen oxides (NOx), unburned hydrocarbons (HC), and other compounds. Exhaust systems typically include a catalyst that reduces the levels of CO, NOx, and HC in the exhaust gas by chemically converting these gases into carbon dioxide, nitrogen, and water. The catalyst reduces the levels of the gases by catalyzing a reaction between the gases and oxygen. The catalyst stores oxygen when operating under lean fuel conditions and consumes the stored oxygen when operating under rich fuel conditions.

A vehicle may operate in a fuel cutoff mode where the supply of fuel to the cylinders is disabled. The fuel cutoff mode may occur when the vehicle is decelerating with no power demand input from a driver and the engine is acting as a brake. During the fuel cutoff mode, the engine pumps air through the exhaust system rather than exhaust gas, resulting in delivery of excess oxygen to the catalyst. The catalyst stores the oxygen until an oxygen storage capacity (OSC) is reached. When the OSC is reached and the supply of fuel to the engine cylinders is restored, the ability of the catalyst to convert NOx emissions may be substantially reduced, resulting in NOx breakthrough. Therefore, when fueling resumes, an increased amount of fueling is delivered to the engine to cause rich fuel conditions and release oxygen from the catalyst. While the rich fuel conditions decrease the amount of oxygen in the catalyst to improve NOx conversion, the rich fuel conditions can diminish improvements in fuel economy provided by fuel cutoff systems.

Thus, while existing fuel cutoff systems of motor vehicles achieve their intended purpose, there is a need for a system and method to reduce the oxygen that is pumped through the catalyst to improve emissions and fuel economy optimization.

SUMMARY

According to several aspects of the present disclosure, a control system for a fuel cutoff system of a motor vehicle includes a fuel cutoff module that determines a deceleration fuel cutoff event. The fuel cutoff module generates a fuel cutoff signal for disabling a supply of fuel to an internal combustion engine, in response to the fuel cutoff module detecting the deceleration fuel cutoff event. The control system further includes an oxygen storage module determining an amount of oxygen accumulated in a catalyst disposed downstream of the engine. The oxygen storage module compares the amount of oxygen to an oxygen storage capacity of the catalyst, in response to the fuel cutoff module determining the deceleration fuel cutoff event. The control system further includes an intake valve timing module generating a phasing signal to actuate a plurality of cam phasers to move to one of a plurality of activated states for modifying a valve timing to reduce a flow rate of oxygen to the catalyst, in response to the fuel cutoff module determining the deceleration fuel cutoff event and in further response to the oxygen storage module determining that the amount of oxygen stored in the catalyst is less than the oxygen storage capacity.

In one aspect, the oxygen storage module is configured to receive a first oxygen signal from a first oxygen sensor disposed upstream of the catalyst. The oxygen storage module is configured to determine an amount of oxygen entering the catalyst, in response to the first oxygen signal and a mass air flow of oxygen into the catalyst.

In another aspect, the oxygen storage module is configured to receive a second oxygen signal from a second oxygen sensor disposed downstream of the catalyst. The oxygen storage module is configured to determine the amount of oxygen in exhaust gas downstream from the catalyst in response to the second oxygen signal.

In another aspect, the fuel cutoff module is configured to receive an engine speed signal from an engine speed sensor coupled to the engine. The fuel cutoff module is configured to determine an engine speed of the engine in response to the engine speed signal.

In another aspect, the oxygen storage module is configured to receive a pressure signal from a pressure sensor coupled to an intake manifold with the pressure signal being indicative of a manifold pressure. The oxygen storage module is further configured to receive a temperature signal from a temperature sensor coupled to the intake manifold, with the temperature signal being indicative of a manifold temperature. In response to the oxygen storage module receiving the pressure signal and the temperature signal, the oxygen storage module is configured to measure the pressure of airflow through the intake manifold and the temperature of airflow through the intake manifold. In response to the measured engine speed, the measured manifold pressure, and the measured manifold temperature, the oxygen storage module determines a mass air flow into the catalyst.

In another aspect, the fuel cutoff module determines the deceleration fuel cutoff event in response to the fuel cutoff module determining that a vehicle speed is greater than a vehicle speed threshold and in further response to an accelerator position being less than a position threshold.

In another aspect, the deceleration fuel cutoff event occurs in response to the engine outputting a negative engine torque.

According to several aspects of the present disclosure, a fuel cutoff system for a motor vehicle includes an internal combustion engine. The engine includes a plurality of engine cylinders and a plurality of intake valves operably engaged with the cylinders, where each of the intake valves is movable between opened and closed positions. The engine further includes a plurality of exhaust valves operably engaged with the cylinders, where each of the exhaust valves is movable between opened and closed positions. The engine further includes a throttle body movable from a closed position to an open position for flowing air to the engine cylinders. The engine further includes a plurality of pistons movable between top and bottom positions within an associated one of the cylinders, and a location of the pistons when the associated intake valves and exhaust valves are disposed in the closed position defines a valve timing. The fuel cutoff system further includes a control system having a fuel cutoff module, an oxygen storage module, and an intake valve timing module. The fuel cutoff module generates a fuel cutoff signal for disabling a supply of fuel to the engine cylinders and moves the throttle body toward the closed position, in response to the fuel cutoff module detecting that a deceleration fuel cutoff event (DFCO event) has occurred. The oxygen storage module determines an amount of oxygen accumulated in a catalyst and compares the amount of oxygen to an oxygen storage capacity of the catalyst, in response to the fuel cutoff module determining the deceleration fuel cutoff event. The intake valve timing module generates a phasing signal to actuate the cam phasers to move to one of the activates states, in response to the fuel cutoff module determining that the deceleration fuel cutoff event has occurred and in further response to the oxygen storage module determining that the amount of oxygen stored in the catalyst is less than the oxygen storage capacity. The fuel cutoff system further includes a plurality of cam phasers operably engaged to the intake valves and the exhaust valves. The cam phasers are movable to a plurality of activated states where the cam phaser modifies the valve timing to reduce the flow rate of oxygen to the catalyst. The cam phaser is movable to a first activated phaser state, where the pistons are disposed in a predetermined default position when the associated intake valves are in the closed position, such that oxygen flows to the catalyst at a first flow rate. The cam phaser is further movable to a second activated phaser state where the valve timing is modified such that the closing of the intake valves is one of advanced or retarded by a cam angle that reduces the flow rate of oxygen from the first flow rate to a second flow rate. The engine cylinders remain held in a fixed activated state where the intake valves and the exhaust valves continuously reciprocate between opened and closed positions while each of the pistons move between top and the bottom positions.

In one aspect, the cam phaser is movable to the second activated phaser state, in response to the intake valve timing module determining that the amount of oxygen accumulated in the catalyst less than the oxygen storage capacity.

In another aspect, the oxygen storage module is configured to receive a first oxygen signal from a first oxygen sensor disposed upstream of the catalyst and determine an amount of oxygen entering the catalyst in response to the first oxygen signal and a mass air flow into the catalyst.

In another aspect, the oxygen storage module is configured to receive a second oxygen signal from a second oxygen sensor disposed downstream of the catalyst, and the oxygen storage module is configured to determine the amount of oxygen in exhaust gas downstream from the catalyst in response to the second oxygen signal.

In another aspect, the fuel cutoff module is configured to receive an engine speed signal from an engine speed sensor coupled to the engine, and the fuel cutoff module is configured to determine an engine speed of the engine in response to the engine speed signal.

In another aspect, the oxygen storage module is configured to receive a pressure signal from a pressure sensor coupled to an intake manifold with the pressure signal being indicative of a manifold pressure, and the oxygen storage module is further configured to receive a temperature signal from a temperature sensor coupled to the intake manifold, with the temperature signal being indicative of a manifold temperature. In response to the oxygen storage module receiving the pressure signal and the temperature signal, the oxygen storage module is configured to measure the pressure of airflow through the intake manifold and the temperature of airflow through the intake manifold. In response to the measured engine speed, the measured manifold pressure, and the measured manifold temperature, the oxygen storage module determines a mass air flow into the catalyst.

In another aspect, the fuel cutoff module determines the deceleration fuel cutoff event, in response to the fuel cutoff module determining that a vehicle speed is greater than a vehicle speed threshold and in further response to an accelerator position being less than a position threshold.

In another aspect, the deceleration fuel cutoff event occurs in response to the engine outputting a negative engine torque.

According to several aspects of the present disclosure, a method of operating a fuel cutoff system for a motor vehicle having an internal combustion engine, a fuel cutoff module, and an oxygen storage module is provided. The method includes moving a plurality of intake valves between opened positions and closed positions. A plurality of engine cylinders move between top and bottom positions, and a location of the pistons when the associated intake valves are disposed in the closed position defines a valve timing. The fuel cutoff module generates a fuel cutoff signal, in response to the fuel cutoff module determining that a deceleration fuel cutoff event has occurred. A supply of fuel to the engine cylinders is disabled in response to the fuel cutoff signal, and the oxygen storage module determines an amount of oxygen stored in a catalyst. A plurality of cam phasers move to a plurality of activated states where the cam phaser modifies the valve timing to reduce the flow rate of oxygen to the catalyst, in response to the fuel cutoff module determining the deceleration fuel cutoff event and in further response to the oxygen storage module determining that the amount of oxygen stored in the catalyst is less than the oxygen storage capacity.

In one aspect, the fuel cutoff module generates the fuel cutoff signal in response to a vehicle speed sensor detecting that a speed of the motor vehicle is greater than a speed threshold.

In another aspect, the fuel cutoff module generates the fuel cutoff signal in response to an accelerator pedal sensor detecting that a displacement of an accelerator pedal from a rest position is less than a displacement threshold.

In another aspect, the engine cylinders are disposed in a first activated phaser state where the intake valves at a default cam angle move between opened and closed positions while the pistons move between top and bottom positions, in response to the cam phasers being disposed in the first activated phaser state.

In another aspect, the engine cylinders are disposed in a second activated cylinder state where the intake valves at an advanced or retarded cam angle move between opened and closed positions while the pistons move between top and bottom positions, in response to the cam phasers being disposed in the second activated phaser state.

Further areas of applicability will become apparent from the description provided herein. It should be understood that the description and specific examples are intended for purposes of illustration only and are not intended to limit the scope of the present disclosure.

DETAILED DESCRIPTION

Figure 1:
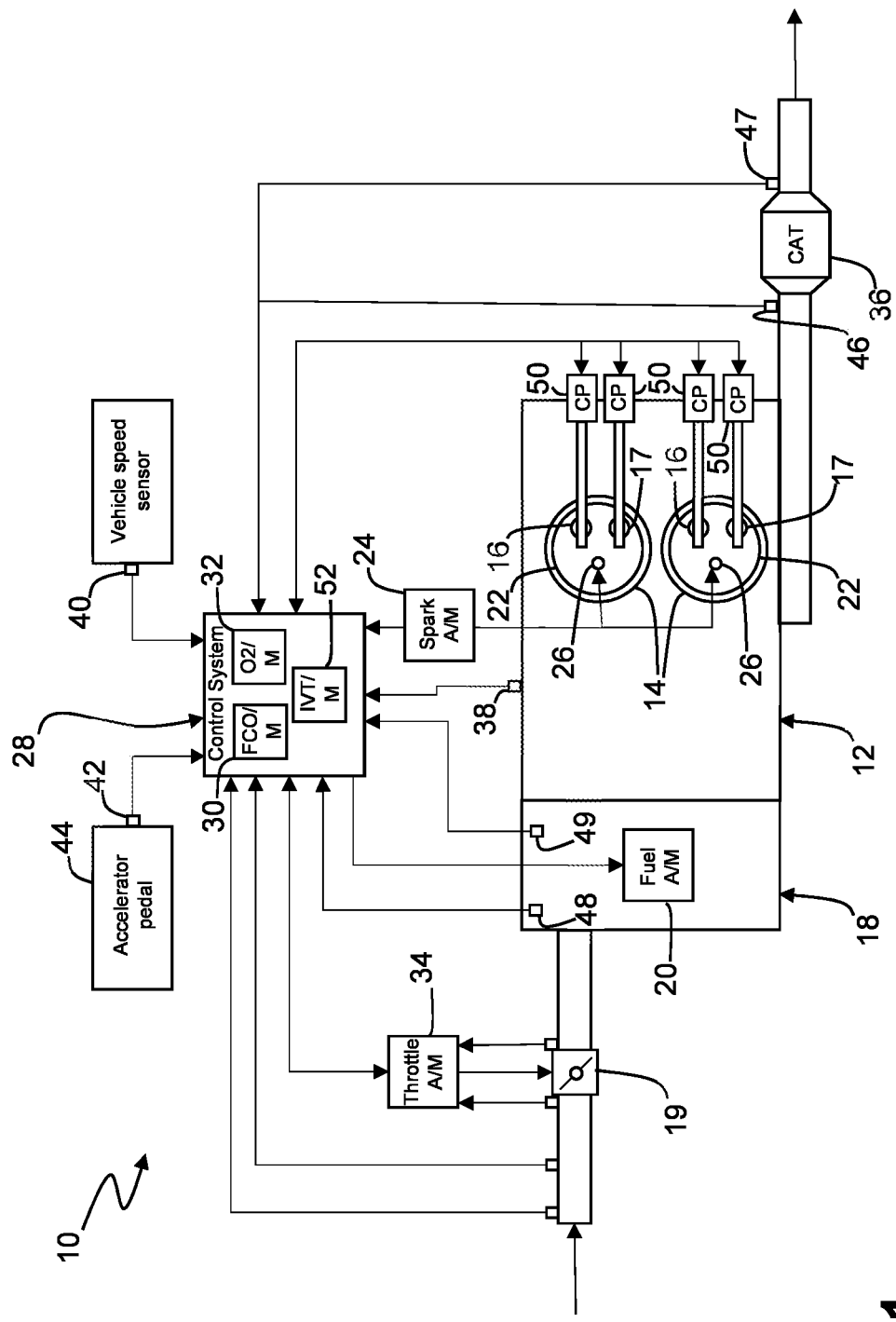
FIG. 1 is a schematic diagram of an exemplary fuel cutoff system for a motor vehicle.

The following description is merely exemplary in nature and is not intended to limit the present disclosure, application, or uses.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical "or." It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As described in detail below, a fuel cutoff system and method reduces a flow rate of oxygen to a catalyst during a deceleration fuel cutoff event DFCO event) and reduces fuel enrichment so as to improve the fuel economy of a motor vehicle.

Referring to FIG. 1, a fuel cutoff system 10 for a motor vehicle includes an internal combustion engine 12 having a plurality of engine cylinders 14. While the engine 12 includes two representative cylinders 14, it is contemplated that the engine may include any number of cylinders. In other examples, the engine may include one, three, four, five, six, eight, ten, eleven, twelve, or any other number of cylinders.

The engine 12 further includes and a plurality of intake valves 16 operably engaged with the associated cylinders 14. Each intake valve 16 is movable between opened and closed positions. The intake valve 16 regulates the flow of air from the intake manifold 18, as described below, into the cylinder 14. It is contemplated that the engine may include any number of intake valves for each cylinder. In other examples, the engine may include two, three, or any other number of intake valves for each cylinder.

The engine 12 further includes and a plurality of exhaust valves 17 operably engaged with the associated cylinders 14. Each exhaust valve 17 is movable between opened and closed positions. The exhaust valve 17 regulates the flow of air from the cylinder 14 into an exhaust system 35. It is contemplated that the engine may include any number of exhaust valves for each cylinder. In other examples, the engine may include two, three, or any other number of exhaust valves for each cylinder.

The engine 12 draws air from an intake manifold 18 through a throttle valve 19. In this non-limiting example, the throttle valve 19 may be a butterfly valve having a rotatable blade for controlling the amount of air drawn into the intake manifold 18. Air from the intake manifold 18 flows into cylinders of the engine 12.

The system 10 further includes a fuel actuator module 20, which regulates fuel injection to achieve a desired air/fuel ratio. Fuel may be injected into the intake manifold 18 at a central location or at multiple locations, such as near the intake valve 16 of each of the cylinders 14, and the injected fuel mixes with air to create an air/fuel mixture delivers to the cylinder 14. In other embodiments, fuel may be injected directly into the cylinders or into mixing chambers associated with the cylinders. The fuel actuator module 20 may halt injection of fuel to cylinders during a fuel cutoff mode as described below.

The engine 12 further includes a plurality of pistons 22 movable between top and bottom positions within an associated one of the cylinders 14, and a location of the pistons 22 when the associated intake valves 16 are disposed in the closed position defines a valve timing. In the top position, the piston 22 compresses the air/fuel mixture.

The system 10 further includes a spark actuator module 24 may energize a spark plug 26 in the cylinder 14, which ignites the air/fuel mixture. The timing of the spark may be specified relative to the time when the piston is at its topmost position, referred to as top dead center (TDC). In diesel engines, the spark actuator module and spark plug may be omitted.

The combustion of the air/fuel mixture drives the piston 22 down, thereby driving a rotating crankshaft (not shown). The piston 22 then begins moving up again and expels the byproducts of combustion through the exhaust valve 17. The byproducts of combustion including exhaust gas are exhausted from the vehicle via an exhaust system 35.

The system 10 further includes a control system 28 having a fuel cutoff module 30, an oxygen storage module 32, and an intake valve timing module 52 that modifies valve timing to reduce a flow rate of oxygen to a catalyst as described below. In this example, the control system 28 is an engine control module (ECM), and the ECM is further electrically coupled to a throttle actuator module 34, which regulates opening of the throttle valve 19 and controls the fuel actuator module 20.

The system 10 includes a catalyst 36 disposed downstream of the engine 12 and fluidly connected to the engine cylinders for receiving exhaust gas from the engine cylinders 14 to convert NOx emissions. During the fuel cutoff mode, excess oxygen is stored by the catalyst, which increases the oxygen storage amount of the catalyst 36 and reduces the ability of the catalyst 36 to convert NOx emissions. When fueling resumes, the fuel actuator module 20 injects fuel to create rich air-fuel mixture to reduce oxygen in the catalyst and restore the ability of the catalyst to convert NOx emissions.

The fuel cutoff module 30 is configured to determine that a DCFO event has occurred. The fuel cutoff module 30 is electrically coupled to the fuel actuator module 20 and configured to generate a fuel cutoff signal for disabling the fuel actuator module 20 from supplying fuel to the engine cylinders 14, in response to the fuel cutoff module determining that the DCFO event has occurred. In this example, the fuel cutoff module 30 may include an engine speed sensor 38 coupled to the engine 12 and configured to detect an engine speed of the engine 12. In response to the engine speed being below a predetermined engine speed threshold, the fuel cutoff module 30 may determine that the DCFO event has occurred. In another example, the fuel cutoff module 30 may further include a vehicle speed sensor 40 for determining a speed of the vehicle an accelerator pedal sensor 42 for detecting a displacement of the accelerator pedal relative to a rest position. In response to the vehicle speed being above a predetermined speed threshold and the displacement of the accelerator pedal 44 being less than a predetermined displacement threshold, the fuel cutoff module 30 may determine that the DFCO event has occurred. In yet another example, the fuel cutoff module 30 may be configured to detect the torque output of the engine. In response to the engine being in an overrunning or engine braking condition where the engine outputs a negative torque, the fuel cutoff module 30 can determine that the DFCO event has occurred.

In response to the fuel cutoff module 30 determining that the DFCO event has occurred, the system 10 is configured to modify valve timing to reduce the flow rate of oxygen to the catalyst, which reduces the probability that the catalyst 36 reaches its OSC and in turn decreases the amount of enriched fuel used for removing oxygen from the catalyst 36 after the DFCO event. In particular, the oxygen storage module 32 is configured to determine an amount of oxygen accumulated in the catalyst 36 and compare the estimated amount of oxygen to an oxygen storage capacity of the catalyst 36. In particular, the oxygen storage module 32 may include a first oxygen sensor 46 disposed upstream of the catalyst 36 and configured to measure an amount or concentration of oxygen in the air entering the catalyst 36 and generate an associated first oxygen signal. The oxygen storage module 32 determines the amount of oxygen stored in the catalyst in response to the first oxygen signal and an estimated mass air flow rate into the catalyst. The oxygen storage module 32 determines mass air flow rate in response to the measured engine speed as described above, a manifold pressure, and a manifold temperature. The oxygen storage module 32 further includes a pressure sensor 48 for measuring the pressure of airflow through the intake manifold 18. The pressure sensor 48 generates a pressure signal associated with the measured pressure and transmits the pressure signal to the oxygen storage module 32. The oxygen storage module 32 furthers includes a temperature sensor 49 for measuring the temperature of airflow through the intake manifold 18. The temperature sensor 49 generates a temperature signal associated with the measured temperature and transmits the temperature signal to the oxygen storage module 32. The oxygen storage module 32 may further include a second oxygen sensor 47 disposed downstream of the catalyst 36 for detecting the amount of oxygen in exhaust gas downstream from the catalyst, which in turn indicates that the catalyst 36 has reached its oxygen storage capacity. The second oxygen sensor 47 generates a second oxygen signal associated with the detected amount of oxygen and transmits the second oxygen signal to the oxygen storage module 32.

The system 10 further includes a plurality of cam phasers 50 operably engaged to an associated one of the intake valves 16 and the exhaust valves 17 for modifying the valve timing. Each cam phaser 50 is movable to a plurality of activated states where the cam phaser 50 modifies the valve timing to reduce the flow rate of oxygen to the catalyst 36 during a DFCO event. More specifically, the pistons 22 are disposed in a predetermined default position when the associated intake valves 16 are disposed in the closed position and the cam phaser 50 is disposed in a first activated phaser state, such that oxygen flows to the catalyst at a first flow rate. In response to the cam phaser 50 being disposed in a second activated phaser state, the valve timing is modified such that the closing of the intake valves is either advanced or retarded by any suitable cam angle that reduces the flow rate of oxygen from the first flow rate to a second flow rate. In this non-limiting example, each cam phaser is an electric cam phaser. However, the cam phaser can be any suitable cam phaser that modifies valve timing to reduce the flow of oxygen to the catalyst.

The intake valve timing module 52 is configured to generate a phasing signal to actuate the cam phaser 50 to move to one of the activated states for modifying valve timing, in response to the fuel cutoff module 30 determining that the deceleration fuel cutoff event has occurred and in further response to the oxygen storage module 32 determining that the amount of oxygen stored in the catalyst 36 is less than the oxygen storage capacity. The cam phasers receives the phasing signal for moving to any one of the activated states.

In this example, the fuel cutoff module 30 further activates the throttle actuator module 34 for moving the throttle body 19 toward the closed position to further reduce flow of oxygen to the catalyst, in response to the DFCO event and the catalyst reaching its OSC.

The engine cylinders 14 remain held in a fixed activated state where the valves 16 continuously reciprocate between opened and closed positions while each of the pistons 22 move between top and the bottom positions.

Figure 2:
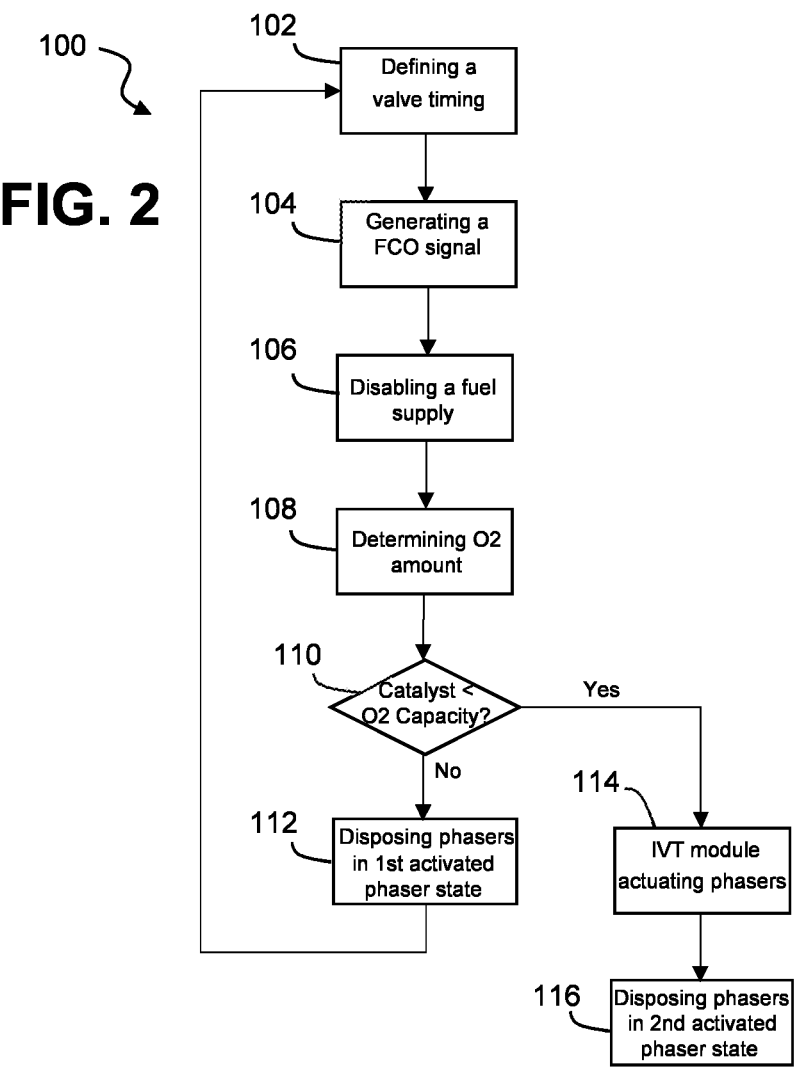
FIG. 2 is a flowchart for a method of operating the system of FIG. 1.

Referring to FIG. 2, a method 100 for operating the fuel cutoff system 10 of FIG. 1 commences at block 102 with the step of defining a valve timing by disposing the pistons at a predetermined location when the associated intake valves 16 are in the closed positions.

At block 104, the fuel cutoff module 30 generates a fuel cutoff signal, in response to the fuel cutoff module 30 determining that the DCFO event has occurred and in further response to the oxygen storage module determining that the amount of oxygen in the catalyst 36 is less than the oxygen storage capacity of the catalyst 36. The fuel cutoff module 30 may determine that the DFCO event has occurred, in response to the fuel cutoff module 30 determining that the engine speed is below a predetermined engine speed threshold. The fuel cutoff module 30 may further determine that the DFCO event has occurred, in response to vehicle speed being above a predetermined speed threshold and in further response to the displacement of the accelerator pedal being less than the predetermined displacement threshold. Furthermore, the fuel cutoff module 30 may determine that the DFCO event has occurred, in response to the torque output of the engine being negative in an overrunning or engine brake condition.

At block 106, the ECM 28 actuates the fuel actuator module 20 to disable the supply of fuel to the engine cylinders 14 of the engine 12 in response to the fuel cutoff signal.

At block 108, the oxygen storage module 32 determines the amount of oxygen stored in a catalyst. This step may be accomplished by the first oxygen sensor 46 detecting the amount or concentration of oxygen in the air entering the catalyst 36 and the oxygen storage module determining mass air flow into the catalyst in response to the measured engine speed, manifold pressure, and manifold temperature.

At block 110, the ECM 28 compares the amount of oxygen stored in the catalyst to the oxygen storage capacity of the catalyst 36. If the amount of oxygen stored in the catalyst is equal to the oxygen storage capacity, the method proceeds to block 112. If the amount of oxygen stored in the catalyst is below the oxygen storage capacity, the method proceeds to block 114.

At block 112, the cam phasers 50 are disposed in the first activated phaser state while the engine cylinders 14 are disposed in a first activated cylinder state, with the pistons 22 moving between top and bottom positions and the intake valves 16 moving between opened and closed positions. The method returns to block 102.

At block 114, the intake valve timing module 52 actuates the cam phaser 50 to move from the first activated phaser state to one of the second activated phaser states where the cam phaser 50 modifies the valve timing to reduce the flow rate of oxygen to the catalyst 36.

At block 116, the cam phasers 50 are disposed in the second activated phaser state while the engine cylinders 14 are disposed in a second activated cylinder state, with the pistons moving between top and bottom positions and the intake valves 16 moving between opened and closed positions.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A control system for a fuel cutoff system of a motor vehicle, the control system comprising:
   a fuel cutoff module determining a deceleration fuel cutoff event and generating a fuel cutoff signal for disabling a supply of fuel to an internal combustion engine in response to the fuel cutoff module detecting the deceleration fuel cutoff event;
   an oxygen storage module determining an amount of oxygen accumulated in a catalyst disposed downstream of the engine, and the oxygen storage module comparing the amount of oxygen to an oxygen storage capacity of the catalyst, in response to the fuel cutoff module determining the deceleration fuel cutoff event; and
   an intake valve timing module generating a phasing signal to actuate a plurality of cam phasers to move to first and seconded activated phaser states for modifying a valve timing to reduce a flow rate of oxygen to the catalyst, in response to the fuel cutoff module determining the deceleration fuel cutoff event and in further response to the oxygen storage module determining that the amount of oxygen stored in the catalyst is less than the oxygen storage capacity.

2. The control system of claim 1 wherein the oxygen storage module is configured to receive a first oxygen signal from a first oxygen sensor disposed upstream of the catalyst and determine an amount of oxygen entering the catalyst in response to the first oxygen signal and a mass air flow of oxygen into the catalyst.

3. The control system of claim 2 wherein the oxygen storage module is configured to receive a second oxygen signal from a second oxygen sensor disposed downstream of the catalyst, and the oxygen storage module is configured to determine the amount of oxygen downstream from the catalyst in response to the second oxygen signal.

4. The control system of claim 3 wherein the fuel cutoff module is configured to receive an engine speed signal from an engine speed sensor coupled to the engine, and the fuel cutoff module is configured to determine an engine speed of the engine in response to the engine speed signal.

5. The control system of claim 4 wherein the oxygen storage module is configured to receive a pressure signal from a pressure sensor coupled to an intake manifold with the pressure signal being indicative of a manifold pressure, and the oxygen storage module is further configured to receive a temperature signal from a temperature sensor coupled to the intake manifold, with the temperature signal being indicative of a manifold temperature;
   in response to the oxygen storage module receiving the pressure signal and the temperature signal, the oxygen storage module is configured to measure the pressure of airflow through the intake manifold and the temperature of airflow through the intake manifold; and
   in response to the measured engine speed, the measured manifold pressure, and the measured manifold temperature, the oxygen storage module determines the mass air flow into the catalyst.

6. The control system of claim 5 wherein the fuel cutoff module determines the deceleration fuel cutoff event in response to the fuel cutoff module determining that a vehicle speed is greater than a vehicle speed threshold and in further response to an accelerator position being less than a position threshold.

7. The control system of claim 6 wherein the deceleration fuel cutoff event occurs in response to the engine outputting a negative engine torque.

8. A fuel cutoff system for a motor vehicle, the fuel cutoff system comprising:
   an internal combustion engine comprising:
      a plurality of engine cylinders;
      a plurality of intake valves operably engaged with the cylinders where each of the intake valves is movable between opened and closed positions;
      a plurality of exhaust valves operably engaged with the cylinders where each of the exhaust valves is movable between opened and closed positions;
      a throttle body movable from a closed position to an open position for flowing air to the engine cylinders; and
      a plurality of pistons movable between top and bottom positions within an associated one of the cylinders, and a location of the pistons when the associated intake valves and exhaust valves are disposed in the closed position defines a valve timing;
   a control system comprising:
      a fuel cutoff module generating a fuel cutoff signal for disabling a supply of fuel to the engine cylinders and moving the throttle body toward the closed position in response to the fuel cutoff module detecting a deceleration fuel cutoff event;
      an oxygen storage module determining an amount of oxygen accumulated in a catalyst and comparing the amount of oxygen to an oxygen storage capacity of the catalyst in response to the fuel cutoff module determining the deceleration fuel cutoff event; and
      an intake valve timing module generating a phasing signal to actuate a plurality of cam phasers to move to first and second activated phaser states, in response to the fuel cutoff module determining the deceleration fuel cutoff event and in further response to the oxygen storage module determining that the amount of oxygen stored in the catalyst is less than the oxygen storage capacity; and
   a plurality of cam phasers operably engaged to the intake valves and the exhaust valves, the cam phasers being movable to the first and second activated phaser states where the cam phaser modifies the valve timing to reduce the flow rate of oxygen to the catalyst
   wherein the cam phaser is movable to the first activated phaser state, where the pistons are disposed in a predetermined default position when the associated intake valves are in the closed position, such that oxygen flows to the catalyst at a first flow rate;
   wherein the cam phaser is further movable to the second activated phaser state where the valve timing is modified such that the closing of the intake valves is one of advanced or retarded by a cam angle that reduces the flow rate of oxygen from the first flow rate to a second flow rate that is lower than the first flow rate;
   wherein the engine cylinders remain held in a fixed activated state where the intake valves and the exhaust valves continuously reciprocate between opened and closed positions while each of the pistons move between top and the bottom positions.

9. The fuel cutoff system of claim 8, wherein the cam phaser is movable to the second activated phaser state in response to the intake valve timing module determining that the amount of oxygen accumulated in the catalyst less than the oxygen storage capacity.

10. The fuel cutoff system of claim 9 wherein the oxygen storage module is configured to receive a first oxygen signal from a first oxygen sensor disposed upstream of the catalyst and determine an amount of oxygen entering the catalyst in response to the first oxygen signal and a mass air flow into the catalyst.

11. The fuel cutoff system of claim 10 wherein the oxygen storage module is configured to receive a second oxygen signal from a second oxygen sensor disposed downstream of the catalyst, and the oxygen storage module is configured to determine the amount of oxygen in exhaust gas downstream from the catalyst in response to the second oxygen signal.

12. The fuel cutoff system of claim 11 wherein the fuel cutoff module is configured to receive an engine speed signal from an engine speed sensor coupled to the engine, and the fuel cutoff module is configured to determine an engine speed of the engine in response to the engine speed signal.

13. The fuel cutoff system of claim 12 wherein the oxygen storage module is configured to receive a pressure signal from a pressure sensor coupled to an intake manifold with the pressure signal being indicative of a manifold pressure, and the oxygen storage module is further configured to receive a temperature signal from a temperature sensor coupled to the intake manifold, with the temperature signal being indicative of a manifold temperature;
  in response to the oxygen storage module receiving the pressure signal and the temperature signal, the oxygen storage module is configured to measure the pressure of airflow through the intake manifold and the temperature of airflow through the intake manifold; and
  in response to the measured engine speed, the measured manifold pressure, and the measured manifold temperature, the oxygen storage module determines a mass air flow into the catalyst.

14. The fuel cutoff system of claim 13 wherein the fuel cutoff module determines the deceleration fuel cutoff event in response to the fuel cutoff module determining that a vehicle speed is greater than a vehicle speed threshold and in further response to an accelerator position being less than a position threshold.

15. The control system of claim 14 wherein the deceleration fuel cutoff event occurs in response to the engine outputting a negative engine torque.

16. A method of operating a fuel cutoff system for a motor vehicle, with the fuel cutoff system having an internal combustion engine, a fuel cutoff module, and an oxygen storage module, the method comprising:
  moving a plurality of intake valves between opened positions and closed positions;
  moving a plurality of pistons between top and bottom positions, and a location of the pistons when the associated intake valves are disposed in the closed position defines a valve timing;
  generating, using the fuel cutoff module, a fuel cutoff signal in response to the fuel cutoff module determining a deceleration fuel cutoff event;
  disabling a supply of fuel to a plurality of engine cylinders of the internal combustion engine in response to the fuel cutoff signal;
  determining, using the oxygen storage module, an amount of oxygen stored in a catalyst; and
  moving a cam phaser to first and second activated phaser states where the cam phaser modifies the valve timing to reduce the flow rate of oxygen to the catalyst in response to the fuel cutoff module determining the deceleration fuel cutoff event and in further response to the oxygen storage module determining that the amount of oxygen stored in the catalyst is less than the oxygen storage capacity.

17. The method of claim 16 further comprising the fuel cutoff module generating the fuel cutoff signal in response to a vehicle speed sensor detecting a speed of the motor vehicle being greater than a speed threshold.

18. The method of claim 17 further comprising the fuel cutoff module generating the fuel cutoff signal in response to an accelerator pedal sensor detecting a displacement of an accelerator pedal relative to a rest position being less than a predetermined displacement threshold.

19. The method of claim 18 further comprising activating the engine cylinders in the first activated cylinder state in response to the pistons moving between top and bottom positions and the intake valves moving between opened and closed positions while the cam phaser is disposed in the first activated phaser state.

20. The method of claim 18 further comprising activating the engine cylinders in the second activated cylinder state in response to the pistons moving between top and bottom positions and the intake valves moving between opened and closed positions while the cam phaser is disposed in the second activated phaser state.

* * * * *